United States Patent [19]

Winter et al.

[11] Patent Number: 4,650,261
[45] Date of Patent: Mar. 17, 1987

[54] FASTENER FOR COUPLING PANELS

[75] Inventors: Russell K. Winter, Crownsville; Thomas D. Harvey, Rockville; Nedim Savas, Bethesda; Richard S. Kain, Glenwood, all of Md.

[73] Assignee: Russell William, Ltd., Odenton, Md.

[21] Appl. No.: 629,515

[22] Filed: Jul. 10, 1984

[51] Int. Cl.⁴ ............................................... A47F 3/12
[52] U.S. Cl. ...................................... 312/140; 24/458; 108/111; 211/186; 211/189; 312/263; 403/289
[58] Field of Search .......................... 24/458, 336, 573; 312/140, 263; 108/107, 111, 154; 403/397, 289, 291, 315, 316; 211/186, 189

[56] References Cited

U.S. PATENT DOCUMENTS

| 642,875 | 2/1900 | Paulle | 312/140 |
|---|---|---|---|
| 820,438 | 5/1906 | Plym | 312/140 X |
| 2,654,131 | 10/1953 | Poupitch | 24/458 X |
| 3,279,876 | 10/1966 | St. Cyr | 108/107 X |
| 3,673,643 | 7/1972 | Kindell | 24/458 |
| 3,806,124 | 4/1974 | Ippen et al. | 108/111 X |
| 3,913,289 | 10/1975 | Recker | 312/140 X |
| 4,114,966 | 9/1978 | Schneider | 312/140 X |
| 4,126,230 | 11/1978 | Tyson et al. | 211/189 X |
| 4,223,966 | 9/1980 | Winters | 312/140 |
| 4,444,321 | 4/1984 | Carlstrom | 211/186 |

FOREIGN PATENT DOCUMENTS

| 954351 | 9/1974 | Canada | 24/336 |
|---|---|---|---|
| 399827 | 7/1909 | France | 312/140 |
| 1064123 | 5/1954 | France | 312/140 |
| 666765 | 9/1964 | Italy | 108/107 |
| 554162 | 9/1974 | Switzerland | 312/140 |
| 531594 | 1/1941 | United Kingdom | 24/573 |

Primary Examiner—Kenneth J. Dorner
Assistant Examiner—Thomas A. Rendos
Attorney, Agent, or Firm—Morton J. Rosenberg

[57] ABSTRACT

A molded fastener (10) is provided for releasably coupling a side panel member (16) to a display panel member (18) in generally planar orthogonal relationship. The side panel (16) includes a through opening (20) through which the fastener (10) is partially inserted. The fastener (10) includes a one-piece formation having a base portion (26) with a diameter greater than the diameter of the side panel member through opening (20). The base portion (26) extends to a central portion (30) of the fastener and has a diameter substantially equal to the panel member through opening (20). A pair of longitudinally extending arm members (32 and 34) are secured to the central portion (30) of the fastener (10) and are adapted to clampingly engage the display member (18) on opposing surfaces thereof.

16 Claims, 5 Drawing Figures

FASTENER FOR COUPLING PANELS

BACKGROUND OF THE INVENTION

1. Field of the Invention

This invention directs itself to fastener systems. In particular, this invention directs itself to fastening systems for fastening generally directed orthogonally oriented panel members each to the other in a releasable coupling. More in particular, this invention directs itself to a fastening system including a fastener which frictionally engages a panel member and positively locks the panel member to a substantially orthogonally directed panel member. Still further, this invention relates to a fastener which includes a pair of arm members defining an inclined passageway within which a panel member is slidingly engaged. More in particular, this invention directs itself to a fastener wherein sliding engagement of a panel member is followed by a snapping interfit of the fastener with an opening formed in the panel member. Still further, this invention pertains to a fastening system formed of a plastic-like composition in one-piece formation which clampingly engages a panel member between opposing resiliently formed arm members.

2. Prior Art

Fasteners are well-known in the art. However, fastener systems for coupling generally orthogonally oriented panel members each to the other in a snapping relationship utilizing both a snapping engagement and frictional interface has not been found in the prior art.

One type of shelf mounting system includes a fastening insert through a sidewall panel having an extending arm beneath a corresponding and respective panel. However, such merely allows the display panel to rest on a horizontal surface of the fastener. Such does not provide for the locking effect of the subject concept.

The best prior art known to the Applicants are U.S. Pat. Nos. 4,072,374; 2,172,302; 3,034,615; 2,084,554; 3,561,068; 2,644,213; 3,345,706; 3,393,431; 3,412,437; 3,038,223; and, 3,809,799.

U.S. Pat. No. 4,072,374 is directed to a side fastener clip for a plate member. This system also includes resilient parallel legs which are mounted on a base, however, the leg members are not inclined each with respect to the other, as is provided in the subject fastener which allows for a snap clip type coupling. Additionally, this type of prior art does not provide for the lug members associated with the longitudinally extending arms.

In some prior art references, such as that shown in U.S. Pat. No. 2,172,302, there are provided fastening devices which are clip-like in concept having an upper and lower arm member. In such prior art systems, a pair of projections may be provided however, such does not provide for the interfacing snap fit system as developed by the subject invention concept.

Other prior art systems direct themselves to various complicated fastening devices which increase the manufacturing and capital costs associated with producing such fasteners.

SUMMARY OF THE INVENTION

A fastener which provides for releasable coupling of a side panel member to a display panel member. The side panel member includes a side panel member through opening of predetermined diameter formed therethrough. The fastener includes a base portion having a diameter greater than the predetermined diameter of the side panel member through opening, as well as a central portion of the fastener secured to the fastener base portion having a diameter substantially equal to the panel member through opening diameter. A pair of longitudinally extending arm members are fixedly mounted to the fastener central portion and are adapted to clampingly engage the display member on opposing surfaces thereof.

DESCRIPTION OF THE PREFERRED EMBODIMENTS

Figure 1:
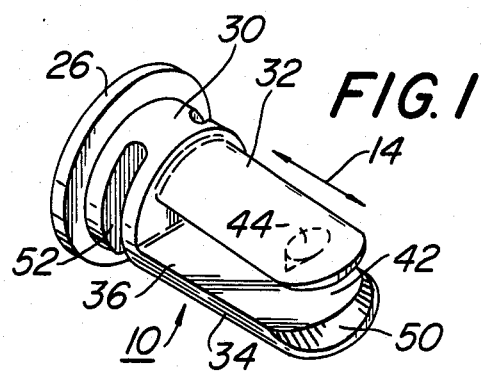
FIG. 1 is a perspective view of the fastener.
Figure 2:
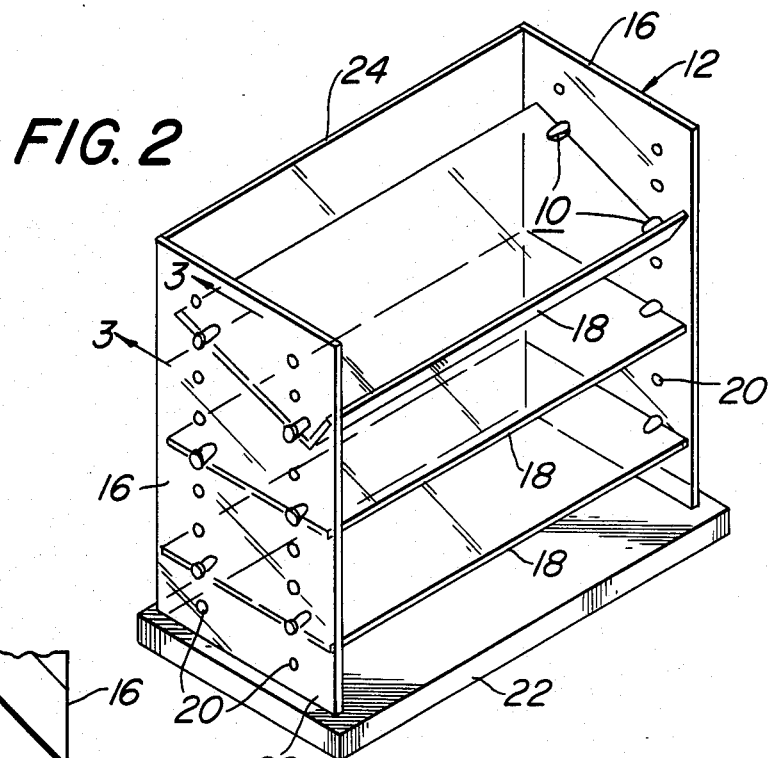
FIG. 2 is a perspective view of the fastener coupling a side panel of the display system.
Figure 3:
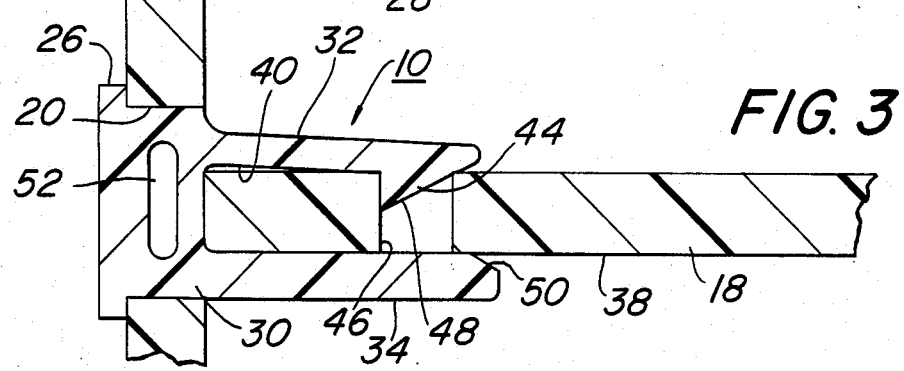
FIG. 3 is a perspective view of the display panel member taken along the Section Line 3—3 of FIG. 2.

Referring now to FIGS. 1-3, there is shown fastener 10 for use with display system 12 as shown in FIG. 2. Fastener 10 is particularly useful for releasably coupling display system side panels 16 to display panel members 18 in a manner to provide structural integrity for display system 12 and allow various objects to be mounted on display panel members 18. Although of particular use in display system 12, it is to be understood that fastener 10 may be utilized in connection with a releasable coupling of panel members each to the other in a wide variety of structural environments. In overall concept, fastener 10 is useful for providing a substantially rigid coupling between panel members 18 and side panel members 16 in a manner which will allow display panel members 18 to be re-positioned and/or re-oriented dependent upon the particular objects being mounted on display panel members 18. Still further, fastener 10 provides for an unobstrusive coupling mechanism which is of simple construction and may be easily removed from a coupling mode of operation.

As can be seen in FIG. 2, display system 12 includes side panel members 16 which have panel member through openings 20 of predetermined diameter formed therethrough. Although not important to the inventive concept as herein described, side panel members 16 and display panel members 18 may be formed of a plastic material composition, wood, metal, or some like material with the only restriction on the material being that such be of sufficient structural integrity to maintain the objects contained therein in a stable manner. Display system 12, as shown in FIG. 2 includes both base member 22 and rear wall member 24 to provide in combination with panel members 16 and 18, a complete display system 12.

Referring now to FIGS. 1-3, it is seen that fastener 10 includes base portion 26 having a diameter greater than the predetermined diameter of side panel member through openings 20. In this manner, when fastener 10 is in an operative coupling mode as shown in FIG. 3, base portion 26 abuts against side panel member external surface 28 and provides for a containment or restraint for passage of fastener 10 through opening 20. Base portion 26 of fastener 10 may be disc-like in contour and includes a diameter approximating 2.0 cm. The dimensions of base portion 26 of fastener 10 are not important to the inventive concept as herein described, but are provided in order to give an illustrative embodiment of an operative structural element.

Fastener 10 extends in longitudinal direction 14 through display side panel member 16 in order to clampingly engage display panel member 18. Central portion 30 of fastener 10 is secured to fastener base portion 26 and forms a rigid coupling therewith. Central portion 30 includes a diameter which is substantially equal to panel member through opening 20, but is slightly less in dimension in order to allow passage therethrough. In overall concept, the diameter of central portion 30 should be of a nature to allow sliding interface with the internal walls of side panel through opening 20 in a manner such that fastener 10 may be manually inserted within through opening 20.

Fastener 10 further includes longitudinally extending arm members 32 and 34 which are fixedly mounted to fastener central portion 30 and adapted to clampingly engage display panel member 18 on opposing surfaces thereof. As seen in FIG. 3, fastener 10 when in the coupled mode of operation with respect to side panel member 16 and display panel member 18, sandwiches display panel member 18 between the pair of arm members 32 and 34. Lower arm member 34 includes a substantially horizontal surface 36 which matingly interfaces in contiguous contact with display panel member lower surface 38. Horizontal surface 36 therefore defines a horizontal plane and extends in longitudinal direction 14 as is shown in FIG. 1.

Upper arm member 32 extends in longitudinal direction 14, however, arm 32 is inclined toward lower arm member 34 throughout an extended length thereof. Upper arm member 32 therefore provides upper horizontal surface 40 which is inclined with respect to the horizontal plane as defined by horizontal surface 36. Arm members 32 and 34 define inclined display panel member insert passageway 42 for insert of panel member 18 therein. Inclined insert passageway 42 has a width which may be slightly less than the width of display panel member 18 throughout a portion of the longitudinal extension of arm members 32 and 34. In this manner, arm member 32 when being inserted into contact with panel member 18 is slightly deformed in order to provide a frictionally clamping movement or displacement of fastener 10 upon panel member 18.

The component portions of fastener 10 may be formed of a plastic-like material composition such as Lexan or some like material composition. However, such plastic material composition is flexible to a certain extent and allows the bifurcated arms 32 and 34 to be resiliently displaced upon insertion over and under panel member 18. The inclination of arm member 32 and particularly horizontal plane 40 of arm member 32 with respect to the horizontal plane surface 36 of lower arm member 34 has an angular inclination within an approximating range of 10°–15°.

In order to insure positive contact and coupling of fastener 10 to display panel members 18, upper arm member 32 includes lug or pin member 44 for insert into through opening 46 of panel member 18. It is noted that through opening 46 may be a recess or other type opening in panel member 18. In this manner, fastener 10 snaps into through opening 46 in order to achieve a positive locking effect with display panel member 18.

Lug member 44 may be formed in the geometrical contour of an inclined truncated cylinder, as is seen in FIG. 1. In this manner, there is provided lug member inclined surface 48 which allows for a possible camming effect as upper arm member 32 is resiliently displaced upon insertion of fastener 10 over panel members 18. Additionally, the vertically directed surface of lug member 44 provides a locking interface with the sidewalls of through opening 46, as is shown in FIG. 3.

As has been stated in previous paragraphs, fastener 10 is formed of base portion 26, central portion 30, and longitudinally extending arm members 32 and 34. Fastener 10 may be formed in a one-piece formation by molding or some like technique. In particular, a commercially viable product has been produced wherein fastener 10 is formed of a plastic material composition and in particular, formed of Lexan. Thus, fastener 10 is easily manufactured and includes a low manufacturing cost when molded in this particular manner.

Due to the fact that fastener 10 is slidingly interfit with panel 18 in an interference type operation with flexible displacement of arms 32 and 34 necessary for insert, there is included chamfer 50 formed on a frontal portion of lower arm 34 in order to provide a further ease of insertion.

Central portion 30 further includes through opening 52 which passes in a direction substantially normal longitudinal direction 14 and is provided in order to allow a substantially constant wall thickness of central portion 30. This opening 52 is deemed to be advantageous due to the fact that molding of central portion 30 when using a plastic material composition has been found to produce air or gas bubbles which may have a deleterious effect on the structural integrity of fastener 10. By providing through opening 52, it has been found that even with the lessening of the material used in the formation of fastener 10, that the structural integrity of fastener 10 is sufficient to maintain panels 18 in a releasable coupling mode of operation.

In general, display panel members 18 and display side panel members 16 are substantially planar in contour and as is seen in FIG. 2, when such are in releasably coupled relation each to the other, such are in substantially orthogonal relation each with respect to the other.

Figure 4:
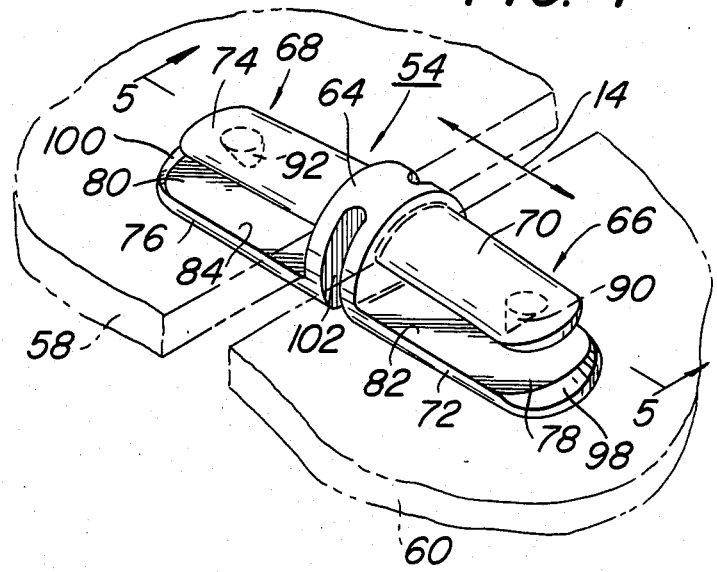
FIG. 4 is a perspective view of another embodiment of the fastener.
Figure 5:
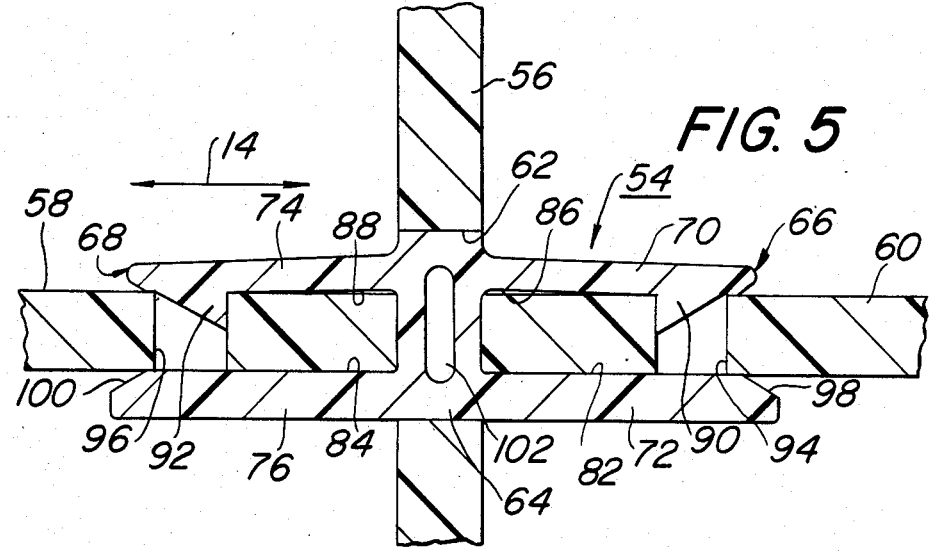
FIG. 5 is a sectional view of the embodiment of the fastener taken along the Section Line 5—5 of FIG. 4.

Referring now to FIGS. 4 and 5, there is shown another embodiment of fastener 10 described in FIGS. 1–3. Fastener 54 releasably couples central panel member 56 to a pair of display panel members 58 and 60 mounted on opposing sides of central panel member 56, as is clearly depicted in FIG. 5. Central panel member 56 includes through opening 62 of predetermined diameter for insertion therein of fastener 54.

Fastener 54 includes base portion 64 having opposing surfaces when taken with respect to longitudinal direction 14. Base portion 64 may be formed in a cylindrical or disc-like overall geometrical contour having a diameter substantially equal to the predetermined diameter of central panel through opening 62.

Fastener 54 includes first and second pairs of longitudinally extending arm members 66 and 68, respectively. First and second pairs of arm members 66 and 68 are extended in longitudinal direction 14 and are fixedly mounted to opposing sides of base portion 64. Each of first and second pairs of longitudinally extending arm members 66 and 68 are adapted to clampingly engage respective panel members 60 and 58 as is clearly seen in FIG. 5. First pair of arm members 66 includes upper arm member 70 and lower arm member 72. Similarly, second pair of arm members 68 includes longitudinally extending upper arm member 74 and lower arm member 76, as is depicted in FIGS. 4 and 5. Each of first and second pairs of longitudinally extending arm members 66 and 68 include at least one arm member from each pair, namely 70 and 74, which are inclined toward the respective other arm member 72 and 76 throughout an extended longitudinal length thereof. In this manner, each of first and second pairs of longitudinally extending arm members 66 and 68 define a respective inclined display panel insert passageway 78 and 80. Insert passageways 78 and 80 include a width slightly less than the width of a respective display panel member 60 and 58 throughout a portion of the longitudinal extension of arm members 70, 72 and 74, 76. In this way, there is provided a frictional interference sliding insert of first and second arm member pairs 66 and 68, as was the case for fastener 10 shown in FIGS. 1-3.

Lower arm members 72 and 76 define horizontal upper surfaces 82 and 84, generally lying in a horizontal plane. Thus, horizontal surfaces 82 and 84 matingly engage in contiguous contact with lower surfaces of respective panels 60 and 58.

Each of inclined arm members 70 and 74 define inclined surfaces 86 and 88, respectively. Inclined surfaces 86 and 88 are inclined with respect to horizontal surfaces 82 and 84 by an angular inclination within an approximating range of 10°-15°, as was the case in the preferred embodiment of fastener 10.

Arm members 70 and 74 include respective lug members 90 and 92 for insert into respective recesses or openings 94 and 96 in panels 60 and 58. Panel openings 94 and 96 may be recesses or through openings, as is shown in FIG. 5. The important concept being that lug members 90 and 92 provide a snap fit coupling of fastener 54 to respective panel members 60 and 58 when lug members 90 and 92 are in registration with respective openings 94 and 96.

Lug members 90 and 92 may be formed in a geometrical contour approximating an inclined truncated cylinder, as is seen in FIGS. 4 and 5.

Fastener 54 may be formed in one-piece formation through molding or some like technique to provide a low manufacturing cost item. Additionally, each of arms 72 and 76 includes chamfers 98, 100, to provide an initial ease of insert of panel 60 and 58 into inclined passageways 78 and 80, as was the case for fastener 10.

Fastener 54 may be formed of a plastic-like material composition such as Lexan which is easily moldable. Additionally, fastener 54 includes through opening 102 passing in a direction substantially normal to longitudinal direction 14 and extending through base portion 64. Through opening 102 provides for a substantially constant wall thickness of base portion 64 and minimizes gas and/or air bubbles which have been found to accumulate in base portion 64 having the deleterious effect of reducing the structural integrity of fastener 54.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A fastener for releasably coupling a side panel member to a display panel member, said side panel member having a side panel member circular through opening of predetermined diameter formed therethrough, said fastener comprising:
    a base portion of said fastener having a diameter greater than said predetermined diameter of said side panel member through opening, a central portion of said fastener secured to said fastener base portion having a diameter substantially equal to said panel member through opening diameter for frictional engagement therein, and a pair of longitudinally extending arm members fixedly mounted to said fastener central portion and adapted to clampingly engage said display member on opposing surfaces thereof, one of said longitudinally extending arm members extending substantially normal a plane defining said side panel member, the other of said longitudinally extending arm members being inclined with respect to said plane of said side panel member defining an inclined display panel member insert passageway having a horizontally directed planar lower surface for insertion of a display panel member in a substantially horizontal plane, one of of said arm members including a lug member for insert into a recess formed in said display panel member, said arm members being insertable through said through opening of said side panel member for slideable insert on said display panel member, said base portion positionally located adjacent an external surface of said side panel member subsequent to said insert.

2. The fastener as recited in claim 1 where said display panel member passageway has a width less than the width of said display panel member throughout a portion of said longitudinal extension of said arm members.

3. The fastener as recited in claim 1 where at least one of said arm members is inclined with respect to the other of said arm members by an angular inclination within an approximating range of 10°-15°.

4. The fastener as recited in claim 3 wherein said fastener base portion central portion and said arm members are formed in one-piece formation.

5. The fastener as recited in claim 4 where said fastener base portion, central portion and arm members are formed of a plastic material composition.

6. The fastener as recited in claim 1 where said lug member includes a geometrical contour of an inclined truncated cylinder.

7. The fastener as recited in claim 1 where said central portion includes a through opening formed therethrough passing substantially normal said longitudinal extension of said arm members for providing a substantially constant wall thickness of said fastener central portion.

8. The fastener as recited in claim 1 where said side panel member and said display panel member are substantially planar in contour and are releasably coupled in substantially orthogonal relation each with respect to the other.

9. A fastener for releasably coupling a central panel member to a pair of display panel members mounted on opposing sides of said central panel member, said central panel member having at least one circular through opening of predetermined diameter formed therethrough, said fastener comprising:
    a base portion having opposing surfaces, said base portion having a diameter substantially equal to said predetermined diameter of said central panel through opening for frictional engagement therein, a first pair of longitudinally extending arm members fixedly mounted to one of said base portion surfaces and a second pair of longitudinally extending arm members fixedly mounted to the other of said opposing base portion surfaces, each of said first and second pair of longitudinally extending arm members adapted to clampingly engage a respective display panel member on opposing surfaces thereof, each of said pairs of longitudinally extending arm members having one of said arm members extending substantially normal a plane defining said central panel member, the other of said longitudinally extending arm members being inclined with respect to said plane of said central panel member defining an inclined display insert passageway having a horizontally directed planar lower surface for insertion of said display panel member in a substantially horizontal plane, each of said pairs of longitudinally extending arm members having a lug member for insert into a respective recess formed in each said display panel member, one of said pairs of arm members being insertable through said through opening of said central panel member for slidable insert on one of said display panel members, said base portion positionally located within said through opening of said central panel member subsequent to said insert.

10. The fastener as recited in claim 9 where each of said respective inclined display panel insert passageways has a width less than the width of a respective display panel member throughout a portion of said longitudinal extension of said arm members.

11. The fastener as recited in claim 9 where at least one of said arm members of each of said first and second pairs of said longitudinally extending arm members is inclined with respect to the other of said arm members by an angular inclination within an approximating range of 10°–15°.

12. The fastener as recited in claim 11 where said lug member includes a geometrical contour of an inclined truncated cylinder.

13. The fastener as recited in claim 9 where said lug member includes a geometrical contour of an inclined truncated cylinder.

14. The fastener as recited in claim 9 wherein said fastener base portion and said first and second pairs of arm members are formed in one-piece formation.

15. The fastener as recited in claim 14 where said fastener base portion and said first and second pairs of arm members are formed of a plastic material composition.

16. The fastener as recited in claim 9 where said base portion includes a through opening passing substantially normal said longitudinal extension of said arm members for providing a substantially constant wall thickness of said fastener base portion.

* * * * *